United States Patent [19]

Dorman

[11] 3,936,068
[45] Feb. 3, 1976

[54] REFUSE CARRIER
[76] Inventor: Ira S. Dorman, 146 Page Drive, Oakland, N.J. 07436
[22] Filed: Dec. 10, 1973
[21] Appl. No.: 423,522

[52] U.S. Cl............ 280/34 B; 280/47.26; 280/47.33
[51] Int. Cl.² ............................................. B62B 1/04
[58] Field of Search ............ 280/34 B, 36 C, 47.24, 280/47.26, 47.31, 47.33, 47.13 R, 63, 42

[56] References Cited
UNITED STATES PATENTS

| | | | |
|---|---|---|---|
| 1,630,975 | 5/1927 | Smith | 280/47.31 |
| 2,602,675 | 7/1952 | Forman | 280/36 C |
| 2,992,011 | 7/1961 | Becan | 280/36 C |
| 3,007,710 | 11/1961 | Sykes | 280/34 B X |
| 3,475,838 | 11/1969 | Hagen et al. | 280/47.24 X |
| 3,506,319 | 4/1970 | Tunnell | 280/47.31 X |
| 3,690,692 | 9/1972 | Florian et al. | 280/36 C |
| 3,722,904 | 3/1973 | Puckett | 280/47.31 X |
| 3,761,107 | 9/1973 | Docherty | 280/34 B |
| 3,861,695 | 1/1975 | Shourek et al. | 280/34 B X |

*Primary Examiner*—M. Henson Wood, Jr.
*Assistant Examiner*—Michael J. Forman

[57] ABSTRACT

A carrier is provided which is readily loaded with ground-borne refuse, and which is of adjustable width to enable convenient storage and optimal adaptation to specific uses.

14 Claims, 4 Drawing Figures 3,936,068

REFUSE CARRIER

BACKGROUND OF THE INVENTION

In an effort to maintain his premises in a neat, attractive and safe condition, the typical homeowner spends considerable amounts of time and effort in the gathering and subsequent disposal of leaves, grass cuttings, and the like. Moreover, in recent years the disposal operation has become increasingly burdensome due to ecologically-imposed bans on open burning of such ground-borne refuse, which bans have been widely adopted.

Although a variety of vacuum machines, blowers sweepers and similar grounds-keeping implements are available, factors such as expense and storage space demands have tended to limit public acceptance of such equipment. Many municipalities now provide for the curb-side pick-up of ground refuse at appropriate times during the year, but this does not, of course, relieve the resident of the responsibility for delivery of the refuse to curb side. Therefore, many people still have to rake large quantities of debris, often over considerable distances, and/or deposit the debris in bags, which typically are flimsy and difficult to load.

Accordingly, it is an object of the present invention to provide a novel refuse carrier which is facile to load and, despite having a relatively large capacity, may conveniently be stored in a relatively small space.

It is also an object of the invention to provide such a carrier in which conventional refuse bags may be supported for facile loading thereof.

Another object is to provide such a carrier which is simple and economical to manufacture.

SUMMARY OF THE DISCLOSURE

It has now been found that the foregoing and related objects of the invention are readily attained in refuse carrier comprised of a chassis and at least one wheel on which the chassis is mounted. The chassis has opposed sidewall portions, rearwardly-disposed handle means for manipulating the carrier, and disengagable means for maintaining lateral spacing between the sidewall portions. The disengagable means serves to at least in part define a front wall portion of the chassis which extends, in the normal transport position of the carrier, generally upwardly from adjacent the wheel, and which terminates in a relatively thin foward edge. A normally upwardly-opening cavity is defined within the chassis by cooperation of the sidewall and front wall portions. The chassis is pivotable in a vertical plane about the wheel from a normal transport position of the carrier, to a forwardly-tipped position in which the chassis rests upon its forward edge and the opening of its cavity is generally forwardly disposed.

The disengagable means may comprise a plurality of elongated members which extend between the sidewall portions of the chassis; in certain embodiments, such members will be disengagable from at least one of the sidewall portions. The elongated members may include a plurality of sections, which are disengagably joined to one another to permit variation of the effective length of the members. In the latter instance, the sections are desirably engagable with one another in a plurality of relative positions, and this may readily be achieved by using tubular sections, one of which is telescopically received in another one thereof.

In the preferred embodiments, the chassis will be comprised of a multiplicity of elongated members which are joined to one another to provide a liner-supporting framework; generally, such a carrier will include a liner which is dimensioned and configured to conform generally to the cavity of the chassis, and which is supported by the framework thereof. Each of the sidewall portions may be a unified assembly of the elongated members, with other such members extending therebetween to provide the disengagable means of the chassis.

In certain embodiments, the carrier includes a bag that is received in the foward portion of the cavity of the chassis, which bag has a mouth that is of lesser dimensions than the cavity opening. The carrier also includes support means on the chassis adjacent its cavity opening and extending thereacross, with the support means and the front wall portion of the chassis cooperatively supporting the bag with the mouth thereof in a relatively open disposition. Finally, the carrier of the invention may include means for maintaining it in its forwardly-tipped position, and that means will generally be a ground-engaging member attached to the chassis.

DETAILED DESCRIPTION OF THE ILLUSTRATED EMBODIMENTS

Figure 1:
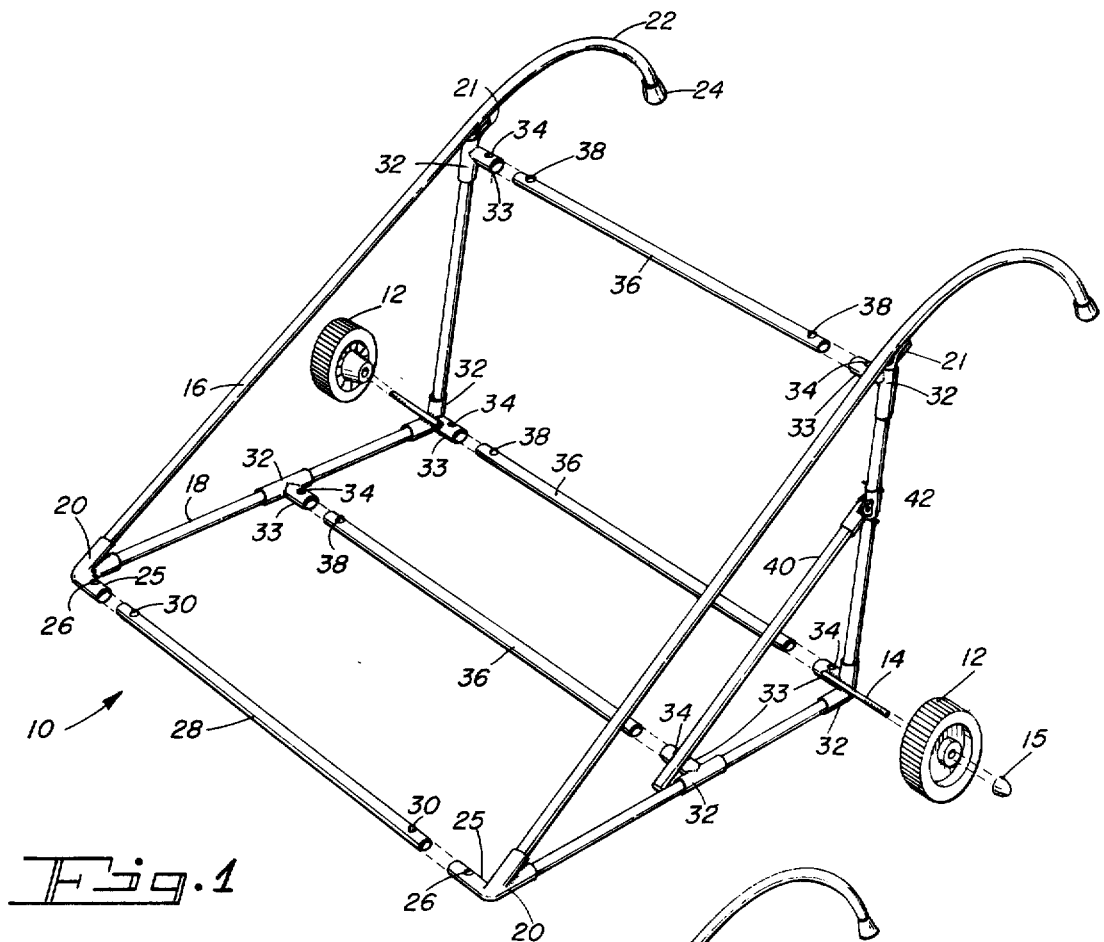
FIG. 1 is an exploded isometric view of a carrier embodying the present invention.

Turning now in detail to FIG. 1 of the appended drawings, therein illustrated is a carrier embodying the present invention, and consisting of a frame or chassis, generally designated by the numeral 10, mounted upon a pair of wheels 12, which are secured thereto by welded stub axles 14 and end fasteners 15. The frame 10 includes a pair of laterally-spaced sidewall portions, each of which consists of an upper member 16 and a V-shaped lower member 18; corresponding upper and lower members 16, 18 are joined at their foward ends by fittings 20 and at their rearward ends by T-shaped fittings 32, one leg 21 of which is collapsed for that purpose. Rear end portions 22 of the upper frame members 16 are configured to provide handles, and caps 24 are furnished on the ends thereof for reasons of safety and appearance. The fittings 20 have inwardly-directed short sleeve portions 25, which have small holes 26 formed therethrough for a purpose to be discussed hereinafter.

A straight crossbar 28 provides one of the frame members that maintain the lateral spacing between the sidewall portions; it also cooperates in defining the front wall portion of the frame, and provides a relatively thin, rectilinear forward edge thereof. As will be noted, each end of the crossbar 28 has a spring-loaded ball detent 30 mounted therein, and it will be appreciated that these detents 30 engage the holes 26 to afford disengageable seating of the ends of the crossbar 28 within the sleeve portions 25 of the fittings 20. Two additional T-shaped fittings 32 are provided on each lower frame member 18, and all fittings 32 have their stems inwardly directed to provide facing sleeve portions 33. A small hole 34 is formed through the sleeve portions 33 of each fixture 32, thus enabling disengageable seating therein of the ends of the crossbars 36, each of which has a spring-loaded ball detent 38 mounted therein for that purpose. Accordingly, it will be evident that the upper frame members 16 and lower frame members 18 may be permanently preassembled to provide unified sidewall portions which can, in turn, be disengageably assembled with the crossbars 28, 36 to provide the carrier frame 10. It will also be evident that the width of the frame 10 can be readily varied to provide configurations that are optimal for specific uses, by substituting crossbars of different length for those illustrated, and that the use of relatively short crossbars or the complete disassembly of the crossbars from the sidewall portions will greatly facilitate storage of the carrier.

Figure 2:
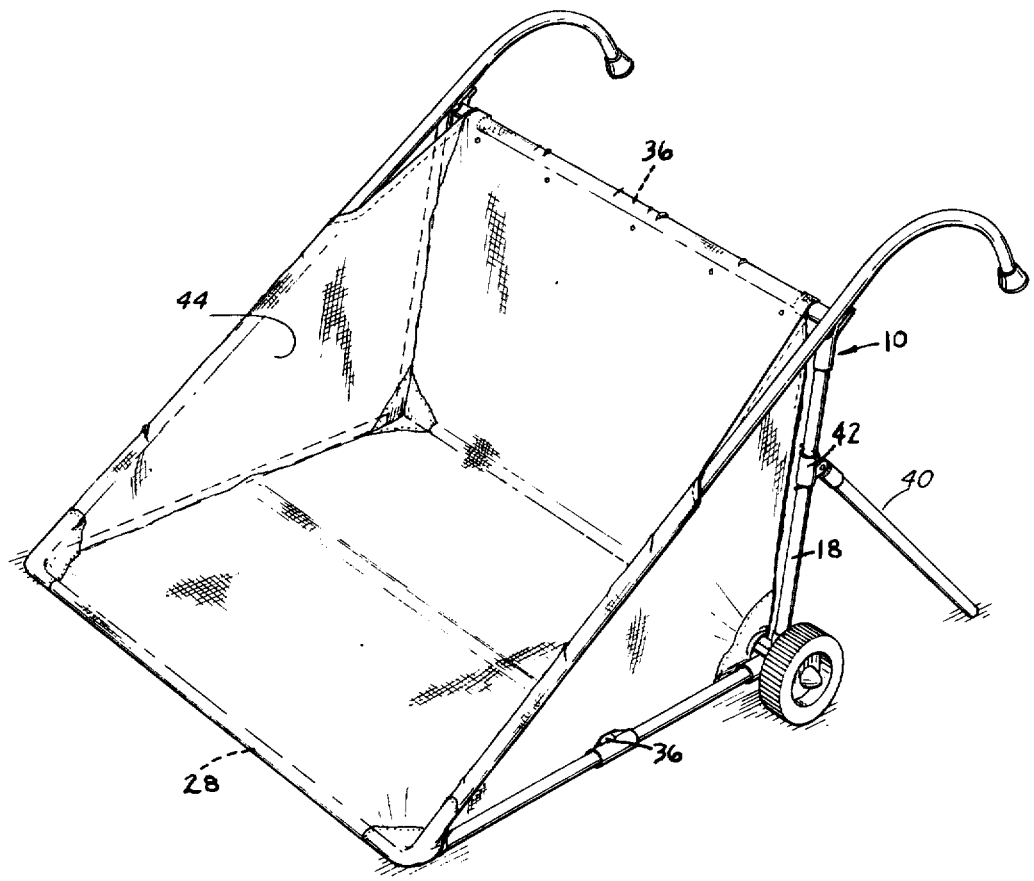
FIG. 2 is an isometric view of the carrier of FIG. 1, with a cavity liner installed and with the chassis in position for loading.

As shown in FIG. 2, the frame 10 is adapted to receive a conforming liner 44, which may be secured therein simply by wrapping the forward marginal area about the crossbar 28, and securing a rearward marginal area about the rearmost crossbar 36. The carrier is in its forwardly-tipped position wherein the forward edge (crossbar 28) rests upon the ground to permit ground-borne refuse to be readily loaded into the liner 44, and it is securely supported in that position by the prop or stake 40. The stake 40 is pivotably affixed at one end to the collar 42 which, in turn, is rotatably mounted on one of the V-shaped lower frame members 18 of the frame 10. Hence, when the stake 40 is not in ground-engageing use, as shown in FIG. 2, it may be turned inwardly to rest upon the intermediate crossbar 36, as shown in FIGS. 1 and 3; the free end of the stake 40 may be configured to optimize ground engagement, if so desired.

Figure 3:
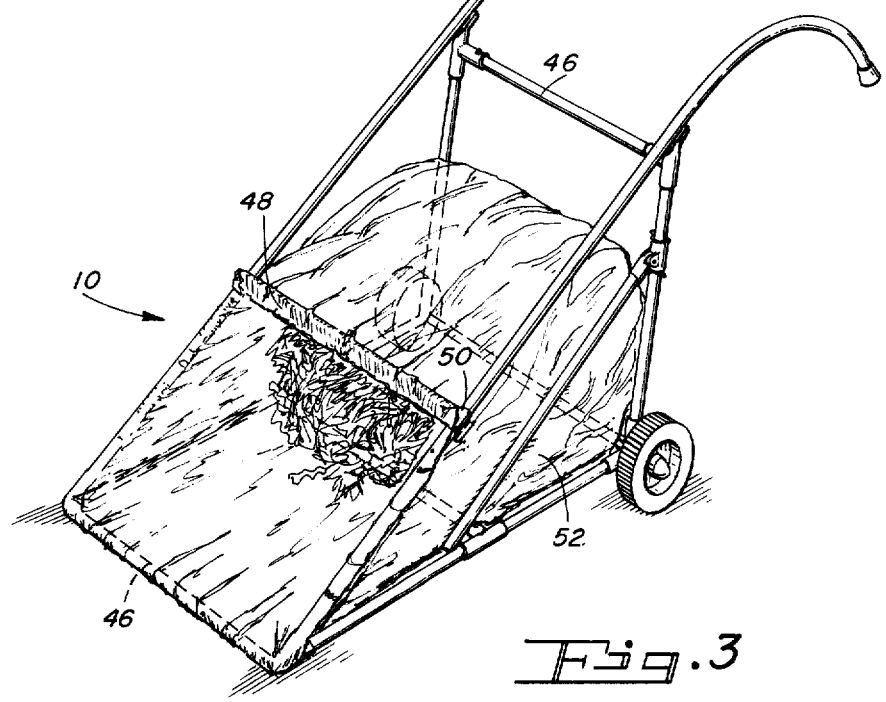
FIG. 3 is an isometric view of the carrier of FIG. 1 in a laterally contracted configuration and in position for loading, with a refuse bag and support plate added thereto.

Turning now specifically to FIG. 3, the crossbars 28, 36 of FIGS. 1 and 2 have been replaced by the crossbars 46, which are of the same construction but are considerably shorter in length. In addition, an elongated plate 48 is affixed in an upright position between the upper frame members 16, to which it is secured by the clips 50 provided on the opposite ends thereof. A refuse bag 52 of conventional construction (e.g., made of polyolefin film) is placed within the cavity of the frame 10 so that it rests upon the forward wall portion thereof. The marginal areas defining the mouth of the bag 52 are folded over the forwardmost crossbar 46 and wrapped about the plate 48 to further support the bag 52 and maintain its mouth in a relatively open disposition. As will be readily appreciated, the carrier of FIG. 3 is tipped forwardly to permit direct loading of the bag 52 (at the ground level), following which the bag may be closed and transported, on the carrier, to the desired location. Thus, the carrier serves not only as a means for transporting the refuse from place to place, but also as a supporting frame for the bag 52, so that it may be filled conveniently and without the need of lifting the refuse from ground level.

Figure 4:
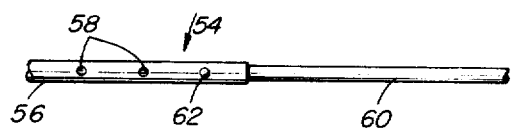
FIG. 4 is an isometric view, to an enlarged scale, of a detent-locked, expanding telescopic crossbar, which is suitable for use as a frame member of the carriers of the present invention.

Finally, FIG. 4 illustrates one type of adjustable crossbar member, generally designated 54, which can be substituted for the crossbar members described in connection with the preceeding figures. It consists of an outer tubular section 56, in which is formed three small holes 58, and an inner tubular section 60, which is telescopically received within the outer section 56 and has a spring-loaded ball detent mounted adjacent its inner end, the detent being designated 62. The advantage of the crossbar 54 resides primarily in its ability to be locked in any of several positions, thereby enabling its use in place of plural sets of the non-expandable crossbars previously described. Although another advantage of such a variable-length crossbar is that it permits width adjustments to be made without disconnection of the sidewall portions, they too may have detent or other temporary locking means in their end portions to afford such disconnection, if so desired.

While it has not been specifically mentioned heretofore, it will be appreciated that the frame members of the instant carrier are advantageously of tubular metal stock; however, as will be appreciated by those skilled in the art, many variations in the basic structure as well as in the auxiliary features are possible within the scope of the invention. Thus, wheel locks, or other frame-mounted members, may be used in place of the ground-engaging stake shown in FIGS. 1 and 2, for the purpose of securing the carrier in its forwardly-tipped position. Indeed, as is suggested by FIG. 3, such position-maintaining means may be dispensed with entirely, with the weight distribution of the carrier itself being relied upon to maintain it in the loading position. Similarly, the mechanism for spacing-apart the sidewall portions may deviate considerably from those which are illustrated and, for example, folding members may be employed. It should be appreciated that, as used herein, the phrase "disengagable means" is intended to include members that are completely disengagable from the sidewall portions, as well as elements or sections that are disengagable from one another; the significant characteristic of such means is that it be adapted to permit changes in sidewall portion spacing (i.e., width variations) to be made, and complete separation or disconnection is not necessarily implicit in the phrase.

The liner employed will generally be made of canvas or other durable fabric, although tough plastic sheet and other materials of construction may prove to be preferable in some instances. Moreover, while relatively supple or flexible liners will normally facilitate the discharge of the collected refuse from the carrier, rigid or semi-rigid inserts may be used. The means by which the liner is attached to the frame will depend largely upon the nature of the liner itself, and upon the degree of permanency of attachment that is desired; any conventional means (e.g., hemming, snapping, threading, pinning, buttoning, hooking, etc.) may be used for that purpose, and the most appropriate choice will readily occur to those skilled in the art.

Similarly, although the upright, cavity-spanning plate shown in FIG. 3 may be a preferred type of bag-support member, it is merely exemplary of the various means that may be used for that purpose. For example, one of a pair of clips may instead be provided on each of the upper frame members to grip the bag and support it in the desired manner, albeit with lesser assurance that the mouth of the bag will be held in a fully open disposition. The several crossbars of the illustrated embodiments serve not only as structural frame members, but also as supports for the liner or for the bag, as the case may be. Nevertheless, it may be desirable to provide added underlying support, and particularly so for the typically flaccid plastic film bags which, in the absence of such support, would tend to droop through the frame and drag upon the ground. A panel, screen, or the like may be installed upon the foward wall of the carrier for that purpose, if so desired; alternatively, the liner may be designed to accommodate a narrowed configuration of the carrier (or it may be distorted to do so), in which event the liner may afford any additional support that may be needed for the bag. Finally, it will be appreciated that the overall configuration of the carrier may deviate greatly from that which is depicted in the drawing, it being only for the purpose of illustrating the invention, and not being intended to constitute a limitation upon the scope thereof. For example, the chassis may have a triangular (rather than rectangular) cross section, with the sidewall portions hingedly joined at the rear, thereby eliminating the rear wall portion depicted in the drawing.

Thus, it can be seen that the present invention provides a novel refuse carrier which is facile to load and which, despite having a relatively large capacity (by virtue of a width across its foward edge that may exceed six feet), is conveniently stored in a relatively small space. The carrier may be used to support conventional refuse bags for facile loading thereof, and it may be of simple and economical manufacture.

Having thus described the invention, I claim:

1. A refuse carrier comprised of a chassis and at least one wheel on which said chassis is mounted, said chassis having opposed sidewall portions, rearwardly-disposed handle means for manipulating said carrier, and readily and substantially nonobstructively disengageable means for temporarily maintaining lateral spacing between said sidewall portions and permitting, upon disengagement of said spacing means, movement of said sidewall portions laterally with respect to one another, said spacing means at least in part defining a front wall portion of said chassis which extends, in the normal transport position of said carrier, generally upwardly from adjacent said wheel and terminates in a relatively thin forward edge, and said sidewall and front wall portions cooperatively defining a normally upwardly opening cavity within said chassis, said chassis being pivotable in a vertical plane about the axis of said wheel from a normal transport position of said carrier to a forwardly-tipped position in which said chassis rests upon said forward edge and said wheel, and the opening of the cavity thereof is generally forwardly disposed, said chassis and said wheel being so dimensioned and disposed, relative to one another, that the center of gravity of said chassis is located rearwardly of said forward edge in the forwardly-tipped position of said carrier, to afford stable resting on said edge.

2. The carrier of claim 1 wherein said spacing means comprises a plurality of elongated members extending between said sidewall portions of said chassis.

3. The carrier of claim 2 wherein said elongated members are disengageable from at least one of said sidewall portions.

4. The carrier of claim 2 wherein each of said elongated members includes a plurality of sections, said sections being disengagably joined to one another to permit variation of the effective length of said members.

5. The carrier of claim 4 wherein said sections of said members are engagable with one another in a plurality of relative positions, the spacing between said sidewall portions being different in each of said relative positions of said sections.

6. The carrier of claim 5 wherein said sections are tubular, and wherein at least one section of each of said members is telescopically received within another one thereof.

7. The carrier of claim 1 wherein said chassis is comprised of a multiplicity of elongated members joined to one another to provide a liner-supporting framework.

8. The carrier of claim 7 additionally including a liner supported by said framework and dimensioned and configured to conform generally to said cavity of said chassis.

9. The carrier of claim 7 wherein each of said sidewall portions is a unified assembly of said elongated members, and wherein a plurality of said elongated members extend between said sidewall portions to provide said disengagable means of said chassis.

10. The carrier of claim 1 wherein each of said sidewall portions has a rigid upper edge portion spaced substantially above said wheel and extending from front to rear along said sidewall portion, and wherein said carrier additionally includes support means affixed to said upper edge portions and spaced rearwardly from said forward edge for supporting, in cooperation with said front wall portion, a bag having a mouth of lesser dimensions than said opening of said cavity and received within the forward portion thereof.

11. The carrier of claim 10 wherein said support means extends across said cavity.

12. The carrier of claim 10 additionally including a bag having a mouth of lesser dimensions than said opening of said cavity and received within the forward portion thereof.

13. The carrier of claim 1 additionally including means for preventing rearward pivoting, and thereby maintaining said carrier in said forwardly-tipped position thereof.

14. The carrier of claim 13 wherein said position-maintaining means is a ground-engageing member attached to said chassis.

* * * * *